Patented Sept. 11, 1951

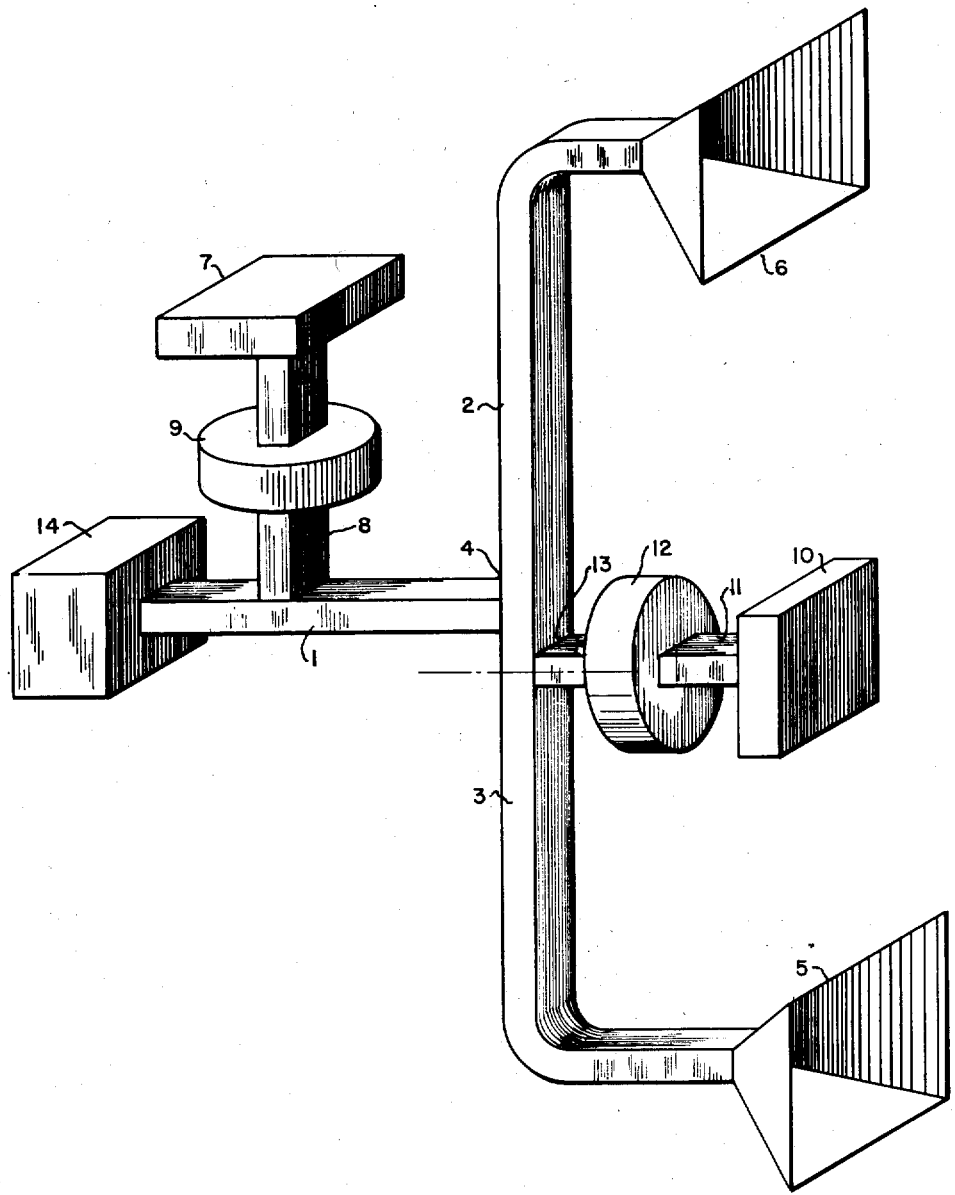

2,567,197

UNITED STATES PATENT OFFICE 2,567,197

DUPLEX SWITCH WITH SUM AND DIFFERENCE FREQUENCY RECEIVERS

Nelson Fox, Metedeconk, N. J., assignor to the United States of America as represented by the Secretary of the Army Application August 30, 1950, Serial No. 182,387

4 Claims. (Cl. 250—13)

(Granted under the act of March 3, 1883, as amended April 30, 1928; 370 O. G. 757)

The invention described herein may be manufactured and used by or for the Government for governmental purposes, without the payment of any royalty thereon.

This invention relates to pulse radar antenna systems and more particularly to such systems used for simultaneous lobing and in which the signals received from two antennas are vectorially added in one channel and vectorially subtracted in another channel.

In one such system, disclosed in the copending joint application of Nelson S. Fox and William Goldberg, Serial No. 152,436, filed March 28, 1950, energy is radiated in phase from two antennas and received by the same antennas. The duplexing device normally utilized is the magic-T waveguide section which consists of four waveguides whose axes intersect at a point, two of the axes being collinear while the axes of the other two are perpendicular to each other and to the collinear waveguide axes. In such a device the only energy which enters the difference channel during transmitting is the difference of the energies reflected from the ends of the collinear arms due to an impedance mismatch. This energy normally is not great enough to actuate the TR switch but may be large enough to harm the input stage of the receiver which stage may be a crystal detector. To overcome this difficulty, it was necessary that the antennas have equal and constant impedances. While it is possible, with great difficulty to build nearly identical antennas it is not possible to insure that their impedances will remain constant during operation because the presence of nearby objects can cause a change of effective impedance or as in some types of scanning antennas, the impedance characteristics are not constant over the entire scanning range.

It is therefore the principal object of this invention to provide a system which will obviate the above difficulty.

According to the invention there is provided an antenna system comprising a main wave transmission means having a source of high frequency energy coupled thereto, two other wave transmission means are connected to the main transmission means at a common point to form two diverging arms of such length that the energies arriving at the open ends thereof and radiated are equal in amplitude and in phase. A receiver is coupled to the main wave transmission means through a TR switch. A second receiver is coupled to one of the arms through a second TR switch at a point offset a predetermined distance from the junction of the arm and main transmission means, whereby the energies received by both waveguides at their open end arrive at the offset junction in the proper phase to vectorially subtract.

The invention together with other objects that may hereinafter appear, will be better understood from the following description taken in connection with the accompanying drawing of one embodiment of the antenna system.

In the figure there is shown a main rectangular waveguide 1 to which a pair of collinear branch waveguides 2, 3 are coupled at a common junction 4 to form an E plane T. The coupling shown is called an E plane coupling since the longitudinal axes of the branch guides are parallel to the electric vector of the dominant mode which is propagated in the main waveguide. One branch is one half a wavelength shorter than the other for reasons which will be explained below in the discussion of the operation of the invention. The open ends of the branch waveguides are terminated in horn antennas 5, 6 which are dimensioned to match the waveguide impedance to the impedance of space. The sum receiver 7 is coupled through a waveguide 8 to the main waveguide 1. Interposed between the receiver 7 and the waveguide 1 is a TR switch 9. The difference receiver 10 is coupled to one of the branch guides at a position offset one quarter of a wavelength from the main junction 4 through a waveguide 11. Interposed in the waveguide 11 is a TR switch 12.

In operation, radio frequency energy from transmitter 14 is propagated in the dominant mode (TE$_{01}$) along waveguide 1 towards the junction 4. In this mode the electric vector of the wave is perpendicular to the wide side of the waveguide. At the junction 4 the wave divides into the two branches. However, now the phase of the energy propagated along the branch guides differs by 180°. Consequently, if the energy is to be radiated by both horns in equal phase, one arm must be longer than the other by one half wavelength as shown. The amplitude of the transmitted energy is sufficient to fire both TR switches thereby protecting both receivers. The operation and construction of these switches are well known in the art. One type is shown in the patent to Clifford et al., No. 2,413,171, issued Dec. 24, 1946. The recovery time of the switch is slow enough so that energy reflected back along the transmission line due to a mismatch of the impedance of the horn to the line will not reach the receivers but not so slow that energy reflected from objects in the radiation field will be blocked.

The energies radiated by both horns are equal in phase and amplitude. Since the horns are preferably mounted close together, the energies form two overlapping beams. The received echoes will have a phase and amplitude depending mainly upon the position of the reflecting object with respect to the horns and the line of sight therefrom defined by the overlapping beams.

Since the energy received by one horn undergoes a further 180° phase shift in the waveguide the energy arriving at junction 4 and propagated along waveguide 1 will be proportional to the vector addition of the two energies. The echo energies arriving at junction 13 do not undergo this additional phase shift and consequently the energy propagated along the difference arm will be proportional to the vector difference of the received energies. The amplitude of the energies will in both cases normally be insufficient to activate the TR switches so that the echoes will reach the receivers. The output of the receivers can be utilized in many ways depending upon the desired characteristics of the system. For instance, they can be combined additively or subtractively to cause a sharper effective radiation or receiving pattern or, as indicated in the above mentioned application, to give the range to the intersection of the line of sight and a particular point on the ground.

The invention is not limited to a waveguide system shown utilizing an E plane junction but an H plane junction can also be used, however, the antenna branches will then of course be of equal length. The system is also equally adaptable to coaxial transmission lines. Where it is desired to use amplitude comparison of the received signals instead of phase comparison, it will be apparent that this can be accomplished by positioning the two branch waveguides so that they feed a single common antenna.

Various other modifications which are within the spirit and scope of the invention will be apparent to those skilled in the art.

What is claimed is:

1. An antenna system comprising a first main waveguide having a source of high frequency energy connected thereto, a second waveguide connected to said first waveguide to form a T junction having first and second arms, the length of said arms being such that the energy propagated along said arms arrives at the ends thereof in equal phase and amplitude, separate antenna means connected to each of said arms, a first branch waveguide connected to one of said arms one quarter wavelength from said T junction whereby energy from both said antenna means arrives at said junction 180° out of phase, receiver means connected to said first branch waveguide, a TR switch in said first branch waveguide for protecting said receiver means, a second branch waveguide connected to said first waveguide, second receiver means connected to said second branch waveguide and a TR switch in said second branch waveguide for protecting said second receiver means.

2. An antenna system comprising a first wave transmission means, a source of radio frequency energy connected to said first wave transmission means, second and third wave transmission means coupled to said first transmission means at a common junction, the lengths of said second and third means being such that the energy propagated into said second and third transmission means arrives at the ends thereof in equal phase and amplitude, separate antenna means connected to said ends, a first receiver means coupled to said first transmission means through a first branch transmission means, TR protective means in said first branch means, second branch transmission means connected to said second transmission means at a position offset from said junction by a predetermined distance whereby the phase of the energies propagated along said second branch is such that only the vector difference will be propagated in said second branch, and TR protective means in said second branch.

3. A first main waveguide, a second waveguide connected to said first waveguide to form an E plane T-junction having first and second arms, said first arm being one-half wavelength longer than said second arm, separate antenna means connected to each arm, a source of radio frequency energy connected to said first waveguide, a first branch waveguide connected to said first arm one quarter wavelength from said T-junction, receiving means connected to said first branch waveguide, a TR switch in said first branch waveguide for protecting said receiving means, a second branch waveguide connected to said first waveguide, second receiving means connected to said second branch waveguide and a TR switch in said second branch waveguide for protecting said second receiving means.

4. A first main waveguide, a second waveguide connected to said first waveguide to form an E plane T-junction having first and second arms, said first arm being one-half wavelength longer than said second arm, separate antenna means connected to each arm, a source of radio frequency energy connected to said first waveguide, a first branch waveguide connected to said first arm in the E plane one quarter wavelength from said T-junction, receiving means connected to said first branch waveguide, a TR switch in said first branch waveguide for protecting said receiving means, a second branch waveguide connected to said first waveguide in the E plane, second receiving means connected to said second branch waveguide and a TR switch in said second branch waveguide for protecting said second receiving means.

NELSON FOX.

REFERENCES CITED

The following references are of record in the file of this patent:

UNITED STATES PATENTS

| Number | Name | Date |
| --- | --- | --- |
| 2,253,589 | Southworth | Aug. 26, 1941 |
| 2,523,398 | Southworth | Sept. 26, 1950 |

FOREIGN PATENTS

| Number | Country | Date |
| --- | --- | --- |
| 581,160 | Great Britain | Oct. 3, 1946 |